United States Patent
Eda et al.

(10) Patent No.: US 12,182,076 B2
(45) Date of Patent: Dec. 31, 2024

(54) INCREASING RESOURCE UTILIZATION IN CLOUD COMPUTING CLUSTERS

(71) Applicant: International Business Machines Corporation, Armonk, NY (US)

(72) Inventors: Sasikanth Eda, Vijayawada (IN); Karthik Iyer, Bangalore (IN); Sandeep Ramesh Patil, Pune (IN); Muthu Annamalai Muthiah, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 18/090,119

(22) Filed: Dec. 28, 2022

(65) Prior Publication Data
US 2024/0220458 A1 Jul. 4, 2024

(51) Int. Cl.
*G06F 16/182* (2019.01)
*G06F 9/50* (2006.01)

(52) U.S. Cl.
CPC ........ *G06F 16/1827* (2019.01); *G06F 9/5033* (2013.01)

(58) Field of Classification Search
CPC ............................ G06F 16/1827; G06F 9/5033
See application file for complete search history.

(56) References Cited

U.S. PATENT DOCUMENTS

| | | |
|---|---|---|
| 9,979,622 B2 | 5/2018 | Niazi et al. |
| 10,592,415 B2 | 3/2020 | Baldwin et al. |
| 2008/0082448 A1 | 4/2008 | Meijer |
| 2017/0064030 A1 | 3/2017 | Maskalik et al. |

(Continued)

FOREIGN PATENT DOCUMENTS

| | | |
|---|---|---|
| CN | 102594852 A | 7/2012 |
| CN | 103544318 A | 1/2014 |

OTHER PUBLICATIONS

International Searching Authority, "Notification of Transmittal of the International Search Report and the Written Opinion of the International Searching Authority, or the Declaration", International application No. PCT/CN2023/134728, International Filing Date Nov. 28, 2023, Mailed on Feb. 27, 2024, 7 pages.

*Primary Examiner* — Hosain T Alam
*Assistant Examiner* — Anthony G Gemignani
(74) *Attorney, Agent, or Firm* — Yee & Associates, P.C.

(57) ABSTRACT

A computer-implemented method for provisioning cloud computing clusters includes receiving a request to create a cloud computing cluster, the cloud computing cluster comprising a clustered filesystem and a requested number of processing nodes and attached storage devices associated with the cloud computing cluster and initiating an initialization process for a single processing node and a corresponding attached storage device responsive to receiving the request to create the cloud computing cluster. The method may also include, previous to completion of the initialization process, requesting and receiving an IP address for the single processing node and a device ID for the corresponding attached storage device from one or more cloud infrastructure controllers and configuring the clustered filesystem and a corresponding WAN cache using the received IP address and the received device ID. A system and computer program product corresponding to the above method are also disclosed herein.

18 Claims, 4 Drawing Sheets

(56) References Cited

U.S. PATENT DOCUMENTS

| | | | |
|---|---|---|---|
| 2018/0091626 A1* | 3/2018 | Baldwin | H04L 67/10 |
| 2019/0034445 A1* | 1/2019 | Balachandran | G06F 16/172 |
| 2020/0218558 A1* | 7/2020 | Ellore Sreenath | G06F 8/71 |
| 2021/0223988 A1 | 7/2021 | Jain et al. | |
| 2022/0019362 A1* | 1/2022 | Badiger | G06F 12/10 |

* cited by examiner

INCREASING RESOURCE UTILIZATION IN CLOUD COMPUTING CLUSTERS

BACKGROUND

The subject matter disclosed herein relates generally to launching cloud-based applications and specifically to provisioning cloud computing clusters and associated resources.

Currently, cloud-based applications experience significant delays in the availability of resources when deployed. For example, assuming a cloud bursting scenario where customers intend to immediately start scaling applications into the cloud, the customer may wait for each resource to be allocated and initialized. Such a scenario may result in a delay of more than an hour before cloud-base applications can begin processing. Subsequent to commencing processing, significant additional time is required to load the large datasets often associated with cloud-based applications.

SUMMARY OF THE DISCLOSED EMBODIMENTS

A computer-implemented method for provisioning cloud computing clusters includes receiving a request to create a cloud computing cluster, the cloud computing cluster comprising a clustered filesystem and a requested number of processing nodes and attached storage devices associated with the cloud computing cluster and initiating an initialization process for a single processing node and a corresponding attached storage device responsive to receiving the request to create the cloud computing cluster. The method may also include, previous to completion of the initialization process, requesting and receiving an IP address for the single processing node and a device ID for the corresponding attached storage device from one or more cloud infrastructure controllers and configuring the clustered filesystem and a corresponding WAN cache using the received IP address and the received device ID.

A system and computer program product that incorporate the above method are also disclosed herein. The computer program product includes a computer readable storage medium having program instructions embodied therewith, wherein the computer readable storage medium is not a transitory signal per se, the program instructions executable by a processor to cause the processor to conduct the above method. The system includes one or more processors and a computer-readable storage medium similar to the computer readable storage medium that is included in the computer program product.

BRIEF DESCRIPTION OF THE DRAWINGS

In order that the advantages of the disclosed embodiments will be readily understood, a more particular description of the embodiments briefly described above will be rendered by reference to specific embodiments that are illustrated in the appended drawings. Understanding that these drawings depict only some embodiments and are therefore not to be considered to be limiting of scope, the embodiments will be described and explained with additional specificity and detail through the use of the accompanying drawings, in which.

DETAILED DESCRIPTION OF THE DISCLOSED EMBODIMENTS

One of ordinary skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The technology and solutions disclosed herein reduce the delay incurred by cloud computing clients when provisioning cloud computing clusters and associated resources for use in executing cloud-based applications.

Figure 1:
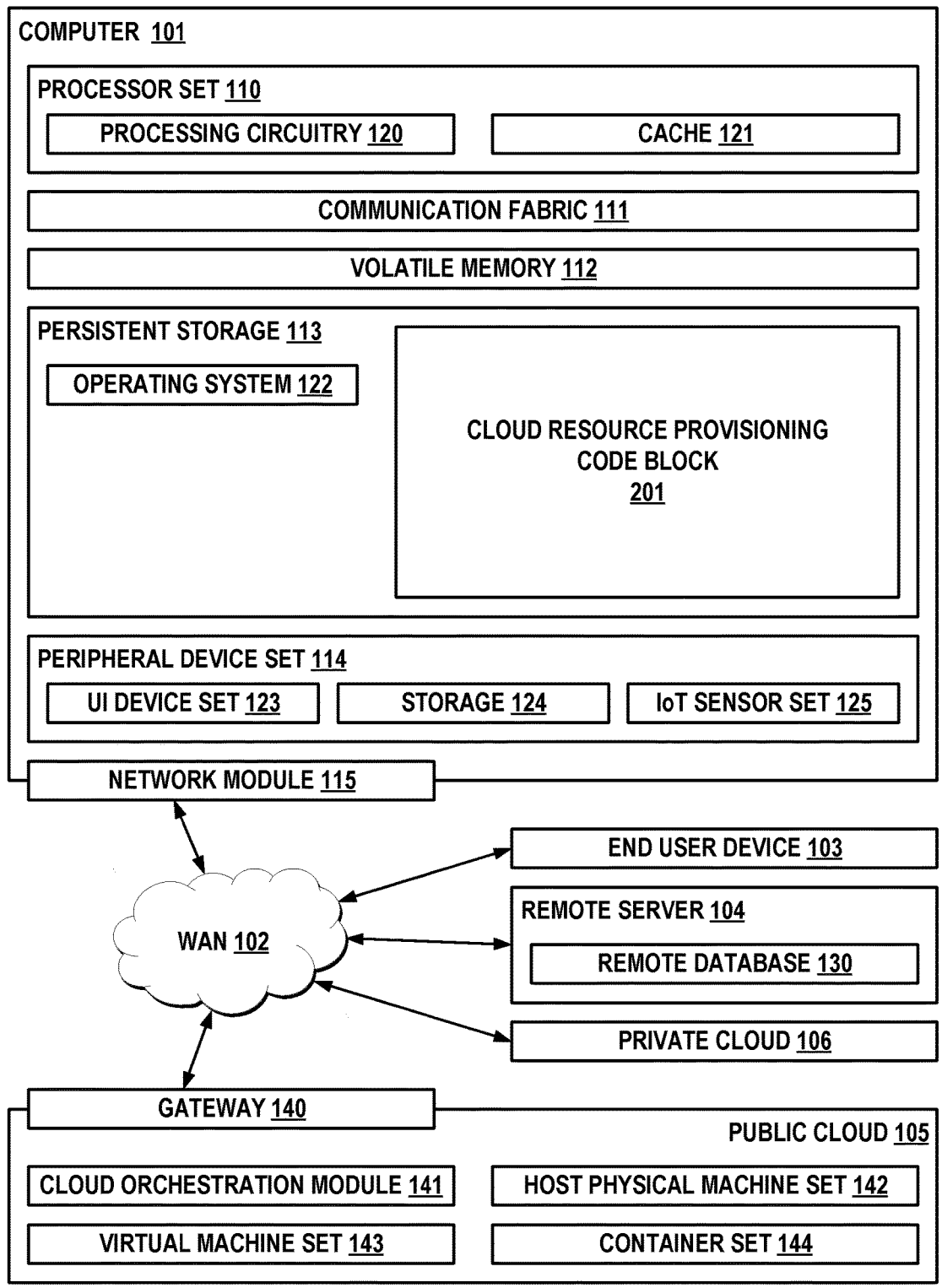
FIG. 1 is a block diagram illustrating various portions of a computing environment in accordance with at least one embodiment disclosed herein.

FIG. 1 is a block diagram illustrating various portions of a computing environment 100 in accordance with at least one embodiment disclosed herein. Computing environment 100 contains an example of an environment for the execution of at least some of the computer code involved in performing the inventive methods or processes, such as code block 201 (corresponding to the method 200 shown in FIG. 2). In some embodiments, portions of code block 201 reside within the operating system 122. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented process, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods such as provisioning cloud computing clusters and associated resources.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
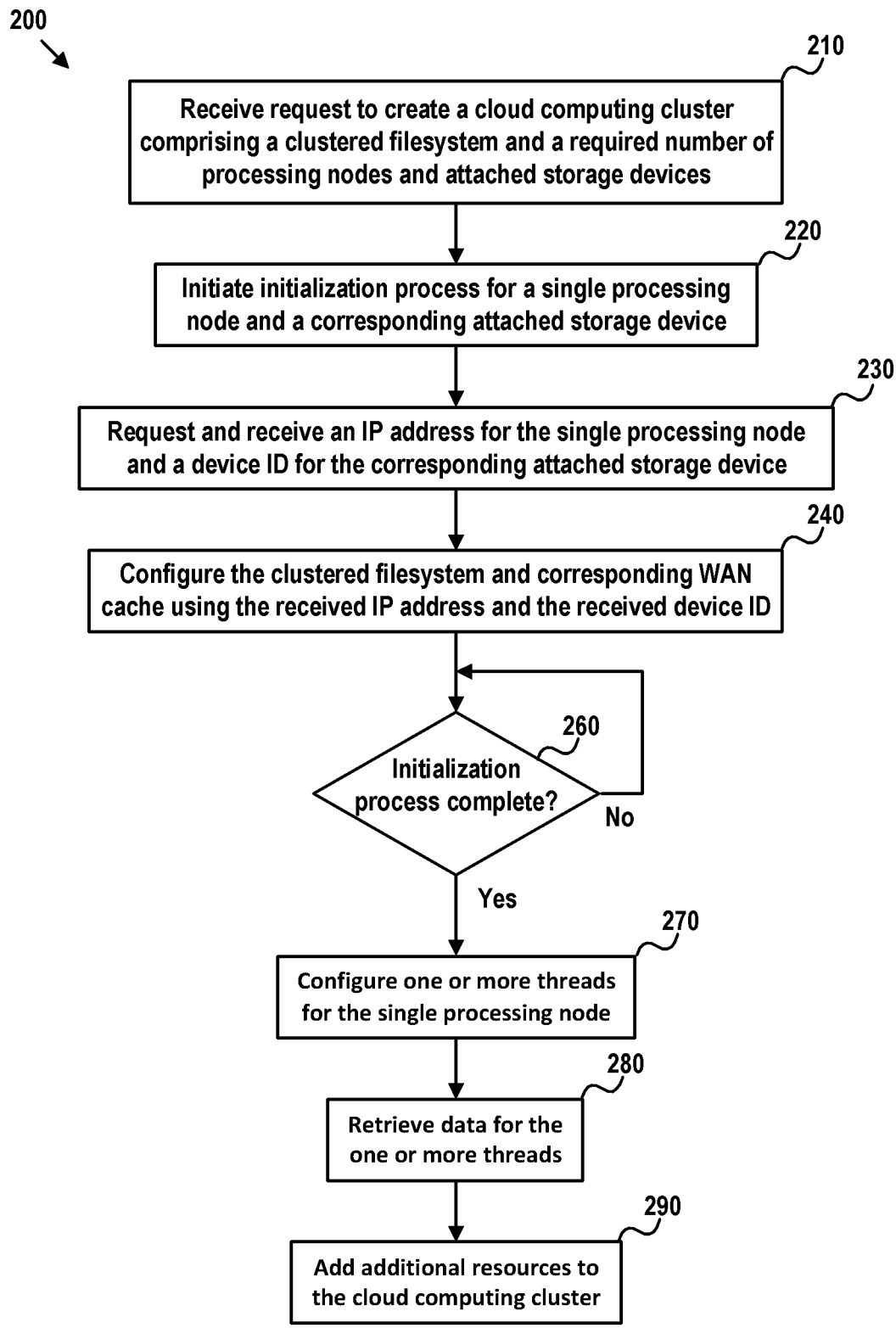
FIG. 2 is a flowchart of one example of a method for provisioning a cloud computing cluster in accordance with at least one embodiment disclosed herein.

FIG. 2 is a flowchart of one example of a method 200 for provisioning a cloud computing cluster in accordance with at least one embodiment disclosed herein. As depicted, the method includes receiving (210) a request to create a cloud computing cluster, initiating (220) an initialization process, requesting and receiving (230) an IP address and a device ID, configuring (240) a clustered filesystem and corresponding WAN cache, determining (260) whether the initialization process is complete, configuring (270) one or more threads, retrieving (280) data, and adding (290) additional resources. The depicted method reduces the initialization delay experienced by cloud applications when provisioning cloud computing clusters and associated resources.

Receiving (210) a request to create a cloud computing cluster may include receiving a request that specifies a requested number of processing nodes and attached storage devices that are to be allocated to a cloud computing cluster. The request may specify a filesystem type such as a clustered filesystem.

Initiating (220) an initialization process may include initiating an initialization process for a single processing node and a corresponding attached storage device. The initiated initialization process may be limited to a single processing node and corresponding attached storage device in order to reduce the initialization latency and the wait time imposed before useful processing can occur. Furthermore, the initiating party may offload the initialization process and continue with additional useful operations (e.g., operations 230 and 240) while the initialization process is completed.

Requesting and receiving (230) an IP address and a device ID may include requesting the IP address for the processing node and the device ID for the corresponding attached storage device. The request may be submitted to one or more cloud infrastructure controllers which may respond with the IP address and the device ID.

Configuring (240) a clustered filesystem and corresponding WAN cache may include using the received IP address and device ID to initialize various configuration settings and parameters within the clustered filesystem and the corresponding WAN cache. The setting and parameters may be changed before the initialization process is complete.

Determining (260) whether the initialization process is complete may include testing a semaphore that indicates that the status of the initialization process. Alternatively, a callback function may be invoked by the initialization process when initialization of the single processing node and the corresponding attached storage device is finished. The callback function may reactive the method 200 at operation 270.

Configuring (270) one or more threads may include configuring threads associated with the single processing node. Retrieving (280) data may include retrieving data needed by the threads associated with the single processing node. The act of retrieving the data may place data into the WAN cache.

Adding (290) additional resources may include adding additional resources to the cloud computing cluster that are required by the cloud computing cluster such as additional processing nodes and corresponding attached storage devices.

One of skill in the art will appreciate that the above method for provisioning a cloud computing cluster enables a cloud application to begin execution of application threads before all the resources associated with a cloud computing cluster have been fully provisioned. Consequently, cloud-based applications can commence processing sooner and the delays associated with loading new cloud-based applications can be reduced.

Figure 3:
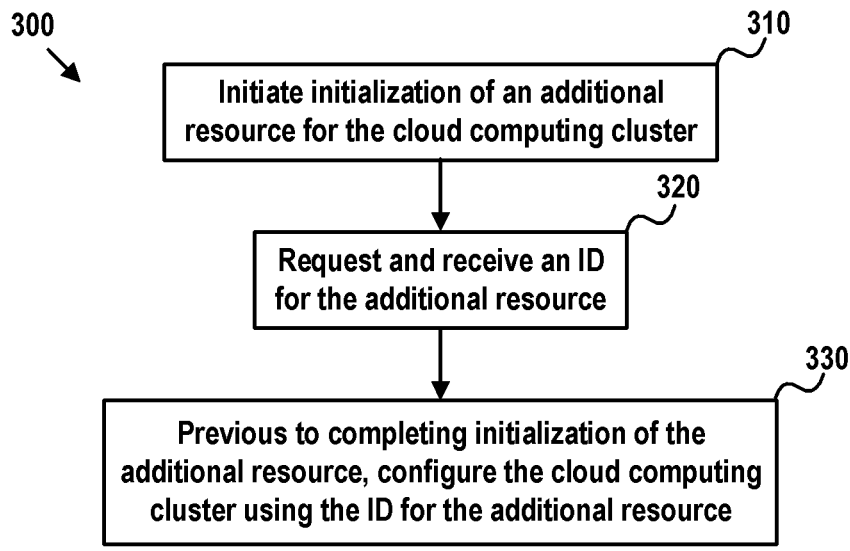
FIG. 3 is a flowchart of one example of a method for adding resources to a cloud computing cluster in accordance with at least one embodiment disclosed herein.

FIG. 3 is a flowchart of one example of a method 300 for adding resources to a cloud computing cluster in accordance with at least one embodiment disclosed herein. As depicted, the method 300 includes initiating (310) initialization of an additional resource, requesting and receiving (320) an ID, and configuring (330) the cloud computing cluster.

Initiating (310) initialization of an additional resource may include dispatching an initialization process for an additional processing node or attached storage device. Requesting and receiving (320) an ID may be similar to the requesting and receiving operation 240 and may include requesting an IP address for an additional processing node and/or the device ID for the corresponding attached storage device. The request may be submitted to one or more cloud infrastructure controllers which may respond with the IP address and/or the device ID.

Configuring (330) the cloud computing cluster may include using the received ID to configure clustered filesystem data structures in such a way that they are populated with processing node details (that are still under-provisioning) and/or storage device details (such as labels etc., that are still under-provisioning). One of skill in the art will appreciate that the above approach for adding resources to a cloud computing cluster enables cloud-based applications to prepare to use the resources that are being provisioned and incrementally use the additional resources associated with a cloud computing cluster as they are fully provisioned.

Figure 4:
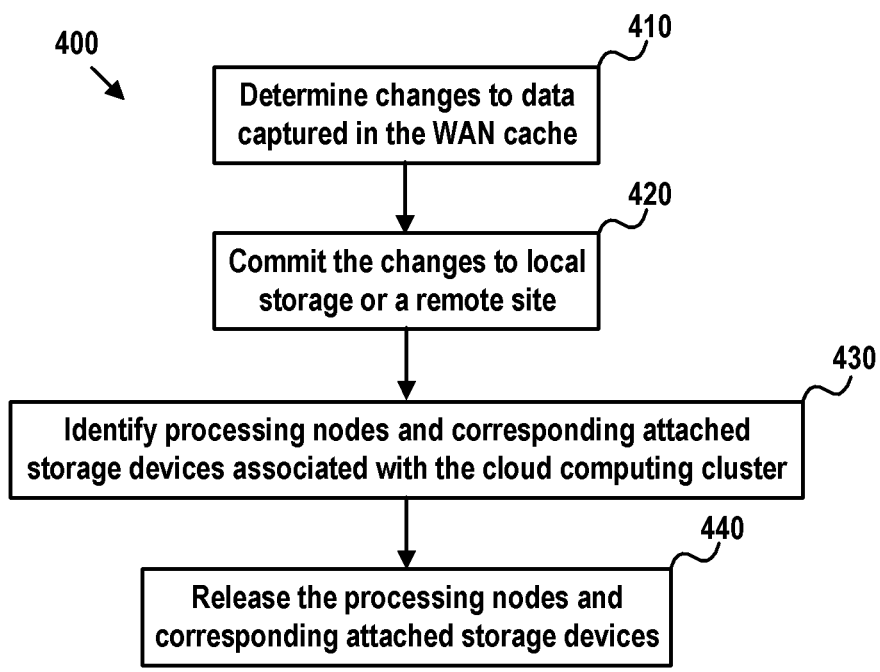
FIG. 4 is a flowchart of one example of a method for releasing a cloud computing cluster in accordance with at least one embodiment disclosed herein.

FIG. 4 is a flowchart of one example of a method (400) for releasing a cloud computing cluster in accordance with at least one embodiment disclosed herein. As depicted, the method includes determining (410) changes to data, committing (420) the changes, identifying (430) processing nodes and storage devices, and releasing (440) the processing nodes and storage devices.

Determining (410) changes to data may include accessing cache coherency data to determine data that has been updated in the cache but has not been written to secondary storage. Committing (420) the changes may include writing the data to secondary storage. Identifying (430) processing nodes and storage devices may include communicating with a cloud infrastructure controller to determine processing nodes and storage devices that have been allocated but not yet released.

Releasing (440) the processing nodes and storage devices may include sending a request to a cloud infrastructure controller to release the processing nodes and storage devices that have been allocated but not yet released.

The methods disclosed herein may be partially or fully embodied within the cloud resource provisioning code block 201 shown in FIG. 1. One of skill in the art will appreciated that the methods disclosed herein may be adapted to the cloud computing environment to which they are deployed without changing the spirit and intent of the disclosed methods. One of skill in the art will also appreciate the utility and effectiveness of the methods and solutions disclosed herein.

The disclosed solutions essentially provide a provisioning framework that helps in optimizing the overall time/dollars spent for WAN caching solution deployment (or making solution—software, hardware, middleware ready for applications) in public/hybrid cloud environments by pre-populating the clustered filesystem records with instance/VM/node details (that are yet to be provisioned) and expanding (flattening) disk structures with disk (volume/EBS) details (that are yet to be provisioned), creating expanded node file, allocation maps and log files. Furthermore, the data prefetch threads may be scaled (where the rate of scaling is dependent on infrastructure provisioning rate), floating window-based re-stripping of storage devices may occur (where the window size is dependent on the disk size that is getting added to the pre-expanded filesystem). Consequently, WAN caching (populating data set needed by the applications) can be initiated during the cluster provisioning phase itself (as opposed to initiating it after cluster configuration phase).

The describe framework provides the following features and flexibility to the traditional clustered filesystem-based WAN caching deployment solution on hybrid/public clouds.
  When the cloud deployment manager receives a request for creating a WAN caching clustered filesystem with a defined threshold of nodes, disks (where the threshold can be increased or decreased depending upon the cloud infrastructure processing unit workload) it will perform;
  A single processing node/VM is provisioned along with an attached storage device. The initial device type and size may be dependent on the bandwidth of the network used to pull the data as part of WAN caching vs. overall provisioning time required to reach full filesystem capacity—usually it will be a fraction of filesystem capacity.
  Requests are made to the cloud infrastructure processing units (IPUs) [a.k.a. cloud infrastructure controllers] to share the node IP details and storage device IDs before provisioning of the nodes and devices. The cloud IPUs reserve these details and use them for provisioning the resources at the configured infrastructure processing rate.
  The clustered filesystem and the Wan caching relationship is initially set up using a single (processing) node cluster. The clustered filesystem data structures are configured in such a way that they are exploded with processing node details (that are still under-provisioning) and disk details (such as labels etc., that are still under-provisioning).

Processing threads are configured and data prefetching is initiated. The number of threads increases based on the number of nodes that get provisioned and join the cluster. This sequencing helps in linearly scaling the WAN cache data prefetching based on the number of new nodes that are joined to the cluster.

Deployment continues with spinning new nodes, attaching NSDs, and adding storage devices to the filesystem.

Data prefetch continues and the framework linearly scales the disk stripping (using floating window-based data restriping) such that data fragments stored on the initial disk start moving to other newly provisioned disks.

In the case of erasure of code-based encoder-based clustered filesystem, data prefetch continues and the framework linearly scales the erasure-coded data segment movement (which could be a "rsync" equivalent operation) such that the data fragments stored on the initial disk start moving to other newly provisioned disks.

When the cloud deployment manager receives a request for teardown the WAN caching clustered filesystem, a similar flow is used where a node and attached storage device(s) are selected, changes to data are identified and the changes are replayed to object storage or to the remote site based on WAN caching resulting in incremental shrinkage of the filesystem data structures. IDs for the selected node and attached storage devices are sent to cloud IPU for resource deallocation ('destruction').

The following may occur in conjunction with the above-described framework and approach.

The user fills in the cloud deployment manager/IaC tool with the requested number of nodes/VMs and NSDs (disks) along with sizes.

The framework identifies the current workload on the cloud infrastructure processing (IPU) unit. If the set processing IPU rate is lower and takes more about of provisioning which results in application wait (the rates and duration are user-configurable as per the cloud vendor published or observed rate of infrastructure provisioning duration).

Provisions a single node+disk attached or a minimally supported blueprint of the filesystem and configure the WAN caching.

While creating the minimally supported blueprint—the framework expands the data structures such that it pre-allocates block ranges, allocation maps, the log groups of the rest of the NSD disks that are going to be attached in the future (or yet to be provisioned).—

The application initiates the data prefetch and starts working on the data.—

As soon as the other NSDs reach available status creating, they are just linked (or can also be some special counter flag is enabled) to these pre-provisioned data structures.

Configuration of prefetch threads (pthreads) gets dynamically changed (increased) based on the rate at which new nodes/NSDs are getting added.

Configuration changes related to Restripe (floating window pattern), just that it does not do a full stripe, rather stripes based on the calculated NSD attachments which are going to happen in the future. Say: (number of files=8, NSD=8)

Iteration-1: File-1 has been fetched with NSD-1

Iteration-2: File-2 has been fetched with NSD-1, NSD-2. Restripe kicks in and moves only stripe-2 blocks of File-1 to NSD-2

Iteration-3: File-3 has been fetched with NSD-1, NSD-2, NSD-3. Restripe kicks in and moves only stripe-3 blocks of File-1 to NSD-3, stripe-3 blocks of File-2 to NSD-2.

In case of tear down, cloud deployment manager receives a request for teardown the WAN caching clustered filesystem. A similar flow is used where a node, disk is elected, changes are identified and changes are replayed to object storage or to the remote site based on WAN caching and the filesystem data structures are shrunk. The elected node is sent to cloud IPU for destruction As disclosed herein, a computer-implemented method for provisioning cloud computing clusters may include:

receiving a request to create a cloud computing cluster, the cloud computing cluster comprising a clustered filesystem and a requested number of processing nodes and attached storage devices associated with the cloud computing cluster initiating an initialization process for a single processing node and a corresponding attached storage device responsive to receiving the request to create the cloud computing cluster previous to completion of the initialization process, requesting and receiving an IP address for the single processing node and a device ID for the corresponding attached storage device from one or more cloud infrastructure controllers previous to completion of the initialization process, configuring the clustered filesystem and a corresponding WAN cache using the received IP address and the received device ID Additional features for the above method may include:

responsive to completion of the initialization process, configuring one or more threads for the single processing node responsive to completion of the initialization process, retrieving data for the one or more threads wherein retrieving data for the one or more threads adds data to the WAN cache responsive to completion of the initialization process, adding additional resources to the cloud computing cluster until the requested number of processing nodes and attached storage devices is achieved wherein adding an additional resource to the cloud computing cluster comprises initiating initialization of the additional resource requesting and receiving an ID for the additional resource from the one or more cloud infrastructure controllers previous to completing initialization of the additional resource using the ID for the additional resource to further configure the cloud computing cluster previous to completing initialization of the additional resource wherein the additional resource is an additional processing node configuring at least one thread for the additional processing node retrieving data for the at least one thread conducting a computing cluster termination process responsive to receiving a request to terminate the cloud computing cluster wherein the cluster termination process comprises:
determining changes to data captured in the WAN cache
committing the changes to local storage or a remote site
identifying processing nodes and corresponding attached storage devices associated with the cloud computing cluster
releasing the processing nodes and corresponding attached storage devices A system and computer program product corresponding to the above method are also disclosed herein. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
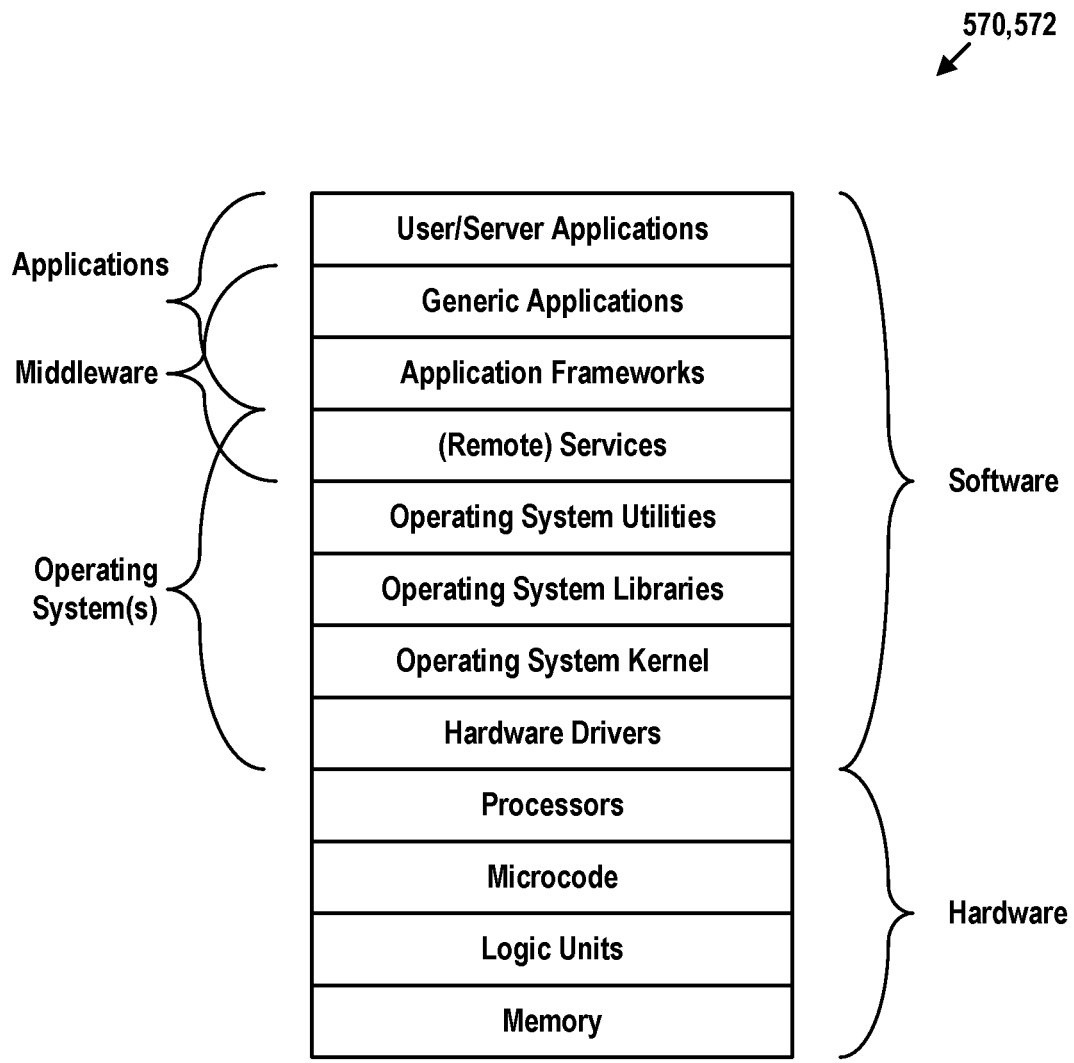
FIG. 5 is a block diagram illustrating one example of a computing stack in accordance with at least one embodiment disclosed herein.

FIG. 5 is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 101 and/or the end user devices 103. One of skill in the art will also appreciate that the depicted layers are given by way of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, processes, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method comprising:
receiving a request to create a cloud computing cluster, the cloud computing cluster comprising a clustered filesystem and a requested number of processing nodes and attached storage devices associated with the cloud computing cluster;
initiating an initialization process for a single processing node and a corresponding attached storage device responsive to receiving the request to create the cloud computing cluster;
previous to completion of the initialization process, requesting and receiving an IP address for the single processing node to produce a received IP address and a device ID for the corresponding attached storage device from one or more cloud infrastructure controllers to produce a received device ID;
previous to completion of the initialization process, configuring the clustered filesystem and a corresponding WAN cache using the received IP address and the received device ID; and
conducting a computing cluster termination process responsive to receiving a request to terminate the cloud computing cluster, wherein the computing cluster termination process comprises:
determining changes to data captured in the WAN cache;
committing the changes to local storage or a remote site;
identifying processing nodes and corresponding attached storage devices associated with the cloud computing cluster; and
releasing the processing nodes and corresponding attached storage devices.

2. The method of claim 1, further comprising configuring one or more threads for the single processing node responsive to completion of the initialization process.

3. The method of claim 2, further comprising retrieving data for the one or more threads responsive to completion of the initialization process.

4. The method of claim 3, wherein retrieving data for the one or more threads adds data to the WAN cache.

5. The method of claim 1, further comprising adding additional resources to the cloud computing cluster, responsive to completion of the initialization process, until the requested number of processing nodes and attached storage devices is achieved.

6. The method of claim 5, wherein adding an additional resource to the cloud computing cluster comprises initiating initialization of the additional resource.

7. The method of claim 6, further comprising requesting and receiving an ID for the additional resource from the one or more cloud infrastructure controllers previous to completing initialization of the additional resource.

8. The method of claim 7, further comprising using the ID for the additional resource to further configure the cloud computing cluster previous to completing initialization of the additional resource.

9. The method of claim 8, wherein the additional resource is an additional processing node.

10. The method of claim 9, further comprising configuring at least one thread for the additional processing node.

11. The method of claim 10, further comprising retrieving data for the at least one thread.

12. A computer program product comprising a computer readable storage medium having program instructions embodied therewith, wherein the computer readable storage medium is not a transitory signal per se, wherein the program instructions are executable by a processor to cause the processor to conduct a method comprising:

receiving a request to create a cloud computing cluster, the cloud computing cluster comprising a clustered filesystem and a requested number of processing nodes and attached storage devices associated with the cloud computing cluster;

initiating an initialization process for a single processing node and a corresponding attached storage device responsive to receiving the request to create the cloud computing cluster;

previous to completion of the initialization process, requesting and receiving an IP address for the single processing node to produce a received IP address and a device ID for the corresponding attached storage device from one or more cloud infrastructure controllers to produce a received device IP;

previous to completion of the initialization process, configuring the clustered filesystem and a corresponding WAN cache using the received IP address and the received device ID; and conducting a computing cluster termination process responsive to receiving a request to terminate the cloud computing cluster, wherein the computing cluster termination process comprises:

determining changes to data captured in the WAN cache;

committing the changes to local storage or a remote site;

identifying processing nodes and corresponding attached storage devices associated with the cloud computing cluster; and releasing the processing nodes and corresponding attached storage devices.

13. The computer program product of claim 12, wherein the method further comprises configuring one or more threads for the single processing node responsive to completion of the initialization process.

14. The computer program product of claim 13, wherein the method further comprises retrieving data for the one or more threads responsive to completion of the initialization process.

15. The computer program product of claim 12, wherein the method further comprises adding additional resources to the cloud computing cluster, responsive to completion of the initialization process, until the requested number of processing nodes and attached storage devices is achieved.

16. The computer program product of claim 15, wherein adding an additional resource to the cloud computing cluster comprises initiating initialization of the additional resource and requesting and receiving an ID for the additional resource from the one or more cloud infrastructure controllers previous to completing initialization of the additional resource.

17. The computer program product of claim 16, wherein the method further comprises using the ID for the additional resource to further configure the cloud computing cluster previous to completing initialization of the additional resource.

18. A system comprising:

one or more processors; and a computer-readable storage medium having program instructions embodied therewith, wherein the computer-readable storage medium is not a transitory signal per se, wherein the program instructions are executable by the one or more processors to cause the one or more processors to conduct a method comprising:

receiving a request to create a cloud computing cluster, the cloud computing cluster comprising a clustered filesystem and a requested number of processing nodes and attached storage devices associated with the cloud computing cluster, initiating an initialization process for a single processing node and a corresponding attached storage device responsive to receiving the request to create the cloud computing cluster, previous to completion of the initialization process, requesting and receiving an IP address for the single processing node to produce a received IP address and a device ID for the corresponding attached storage device from one or more cloud infrastructure controllers to produce a received device IP, previous to completion of the initialization process, configuring the clustered filesystem and a corresponding WAN cache using the received IP address and the received device ID, and conducting a computing cluster termination process responsive to receiving a request to terminate the cloud computing cluster, wherein the computing cluster termination process comprises:

determining changes to data captured in the WAN cache;

committing the changes to local storage or a remote site;

identifying processing nodes and corresponding attached storage devices associated with the cloud computing cluster; and releasing the processing nodes and corresponding attached storage devices.

\* \* \* \* \*